E. M. RUSSELL.
TIRE ARMOR.
APPLICATION FILED NOV. 3, 1915.
1,243,633.
Patented Oct. 16, 1917.
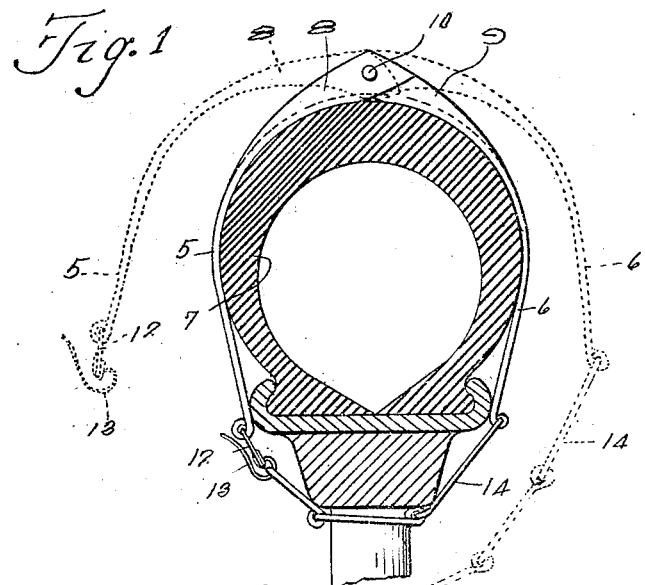
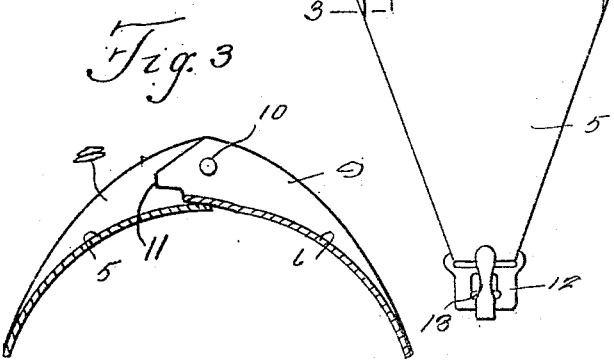
Witness
Chas. H. Trotter
Inventor
E. M. Russell
By
Attorney

UNITED STATES PATENT OFFICE.

EDWARD M. RUSSELL, OF BATTLE MOUNTAIN, NEVADA.

TIRE-ARMOR.

1,243,633.   Specification of Letters Patent.   Patented Oct. 16, 1917.

Application filed November 3, 1915. Serial No. 59,380.

*To all whom it may concern:*

Be it known that I, EDWARD M. RUSSELL, a citizen of the United States, residing at Battle Mountain, in the county of Lander and State of Nevada, have invented certain new and useful Improvements in Tire-Armors; and I do hereby declare the following to be a full, clear, and exact description of the invention, such as will enable others skilled in the art to which it appertains to make and use the same.

This invention relates to tire armor and more particularly to an anti-slipping device designed for attachment to the resilient tires of motor vehicles to prevent slipping or skidding of the wheels upon slippery roads.

The invention has for its primary object to provide a simple and efficient anti-slipping device for pneumatic tires embodying a pair of hinged plates which may be quickly and conveniently attached to or detached from the tire and having anti-slipping flanges thereon through which the pivot pins are positioned.

Another object is the provision of an adjustable and quickly releasable means for securing the anti-slipping device in position upon the tire and wheel rim.

With these and other objects in view, the invention consists in the novel construction, arrangement and formation of parts as will be hereinafter specifically described, claimed and illustrated in the accompanying drawing, in which:

Figure 1 represents a fragmental sectional view through a vehicle wheel and tire, showing the improved anti-slipping device applied thereto.

Fig. 2 represents a side elevation of the anti-slipping device removed, the securing chain being removed, Fig. 3 represents a detail sectional view on the line 3—3 of Fig. 2, and Fig. 4 represents a fragmental detail sectional view illustrating the securing chain in detail.

Referring to the drawing in detail, wherein similar reference numerals designate corresponding parts throughout the several views, the numerals 5 and 6 indicate a pair of plates having the adjacent ends overlapped and being curved longitudinally and transversely to snugly fit the contour of the tread and adjacent side portions of a resilient tire 7. The sections or plates 5 and 6 are formed at their adjacent ends with marginal anti-slipping flanges 8 and 9, respectively, which are gradually increased in width toward the adjacent ends of the plates, as clearly illustrated in Figs. 1 and 3 and the flanges 8 of the plates 5 are lapped over the flanges 9 of the plates 6 and are pivotally secured together by pivot pins 10 positioned through the overlapped portions thereof. The overlapped ends of the plates 5 and 6 are spaced a sufficient distance apart to permit the plates to be separated so as to facilitate attachment and removal of the anti-slipping device to or from the tire 7. The flanges 9 of the plate 6 are formed with extensions 11 which project a slight distance beyond the end of the plate 6 and are adapted to engage the adjacent outer surface of the plate 5 when the plates are separated so as to limit the opening movement thereof.

The free ends of the plates are tapered or reduced in width and the relatively small end of the plate 5 is pivotally secured to one end of a preferred type of fastener 12. In the present embodiment of the invention I have illustrated a fastener including a curved locking lever 13 pivotally secured at one end to the body plate of the fastener and having the portion adjacent the pivoted end curved for engagement with the web portion of any one of the several links composing the securing chain 14, and which latter is pivotally secured to the relatively small end of the other plate 6. As clearly illustrated in Fig. 4, the links of the chain 14 are of U-shaped formation, the free ends of the links being looped about the web portions 15 of the adjacent links, except the link adjacent the reduced end of the plate 6 which latter is pivotally secured to the latter. The length of the several links composing the chain is gradually decreased from the end of the plate 6 to the free end of the chain thereby affording a maximum range of adjustment of the anti-slipping device.

What I claim is:—

1. An anti-skidding device including a pair of plates having their adjoining ends overlapped, upstanding flanges carried by the longitudinal edges of said plates, the flanges of the corresponding edges of the two plates being overlapped, means pivotally connected to the overlapped portions of said flanges, and means connecting the other ends of said plates.

2. An anti-slipping device including a pair of transversely and longitudinally curved plates having their adjacent ends overlapping, marginal anti-slipping flanges formed on the adjacent ends of the plates and overlapping each other, rivets connecting the edges together for permitting the plates to move with relation to each other, and means connecting the other ends of plates.

In testimony whereof I affix my signature in presence of two witnesses.

EDWARD M. RUSSELL.

Witnesses:
DOMINGO BELAUSTEGUI,
DAN GABIOLA.